United States Patent [19]
Liu et al.

[11] Patent Number: 5,833,856
[45] Date of Patent: Nov. 10, 1998

[54] PROCESS FOR BIOLOGICALLY REMOVING PHOSPHORUS AND NITROGEN FROM WASTEWATER BY CONTROLLING CARBOHYDRATE CONTENT THEREIN

[75] Inventors: Yanhua Liu; Zaoyan Yang, both of Tianjin, China

[73] Assignee: Tianjin Municipal Engineering Design and Research Institute, Tainjin, China

[21] Appl. No.: 896,662

[22] Filed: Jul. 18, 1997

[51] Int. Cl.$^6$ ........................................................ C02F 3/30
[52] U.S. Cl. ............................ 210/605; 210/605; 210/615; 210/624; 210/151; 210/195.1; 210/202
[58] Field of Search ............................. 201/605, 607, 201/615–617, 623, 624, 626, 630, 903, 906, 151, 195.1, 197, 199, 201, 202

[56] References Cited

U.S. PATENT DOCUMENTS

| | | | |
|---|---|---|---|
| 4,267,038 | 5/1981 | Thompson et al. | 210/605 |
| 4,537,682 | 8/1985 | Wong-Chong | 210/626 |
| 4,663,044 | 5/1987 | Goronszy | 210/624 |
| 4,948,510 | 8/1990 | Todd et al. | 210/605 |
| 5,128,040 | 7/1992 | Molof et al. | 210/605 |
| 5,213,681 | 5/1993 | Kos | 210/605 |
| 5,246,585 | 9/1993 | Meiring | 210/605 |
| 5,266,200 | 11/1993 | Reid | 210/605 |
| 5,281,335 | 1/1994 | Kuhn | 210/605 |
| 5,288,407 | 2/1994 | Bodwell et al. | 210/617 |
| 5,342,522 | 8/1994 | Marsman et al. | 210/605 |
| 5,534,147 | 7/1996 | Kallenbach et al. | 210/605 |
| 5,582,733 | 12/1996 | Desbos et al. | 210/605 |
| 5,601,719 | 2/1997 | Hawkins et al. | 210/605 |
| 5,616,241 | 4/1997 | Khudenko | 210/151 |

FOREIGN PATENT DOCUMENTS

WO9312044   6/1993   WIPO .

OTHER PUBLICATIONS

Paper to be published in Water Environment Research; Liu, Yan Hua; "Low Sludge Carbohydrate Content: A Prerequisite for Enhanced Biological Phosphate Removal."

Paper presented at 2nd International Conference on Mcroorganisms in Activated Sludge and Biofilm Processes, Jul. 21–23, 1997 Berkely, California; Liu, Yan Hua; "Inspection and Prospect of Enhanced Biological Phosphorus Removal—The Effect of Sludge Carbohydrate Content."
Cech, J.S., and Hartman, P. (1993) "Competition between Polyphosphate and Polysaccharide Accumulating Bacteria in Biological Phosphorus Removal Systems"; Water Res. 27, 1219–1225.

(List continued on next page.)

*Primary Examiner*—Thomas G. Wyse
*Attorney, Agent, or Firm*—Christie, Parker & Hale, LLP

[57] ABSTRACT

The present invention relates to a process and a treatment system for biologically removing phosphorus and nitrogen from wastewater. In the anaerobic contact and settlement zone 1, wastewater 7 is first mixed with the returned activated sludge 8 to form a mixed liquor which is then allowed to settle in zone 1, and organic matters present in influent are mostly taken up by the sludge. The supernatant from zone 1 is passed through an aerobic reaction zone 2, furnished with packings, for complete nitrification; the settled sludge from zone 1 is hold in an anaerobic zone 3 for a sufficient period of time for controlling the sludge carbohydrate content to low levels in order to enlarge the sludge capacity for phosphorus removal because the extended anaerobic sludge degradation in zone 3 is very effective in controlling the sludge carbohydrate content to low levels. The sludge from zone 3 is then allowed to be remixed with the nitrified supernatant from zone 2 in zone 4, where the products of the extended anaerobic reaction allowed very high denitrification rates and efficiencies. The aerobic zone 5 is supplemented to complete phosphorus uptake by the activated sludge, in which the dissolved oxygen (DO) level is controlled at relatively low levels in order to limit the aerobic synthesis of sludge carbohydrate. The aerated mixed liquor is then transferred into a final clarifier where settled sludge is separated from purified supernatant. At least a portion of the settled sludge is recycled back to zone 1 to be mixed with raw wastewater, while a portion of the settled sludge is wasted.

8 Claims, 3 Drawing Sheets

OTHER PUBLICATIONS

Satoh, H., Mino, T., and Matsuo, T. (1992) "Uptake of Organic Substrates and Accumulation of Polyhydroxyalkanoates Linked with Glycolysis of Intracellular Carbohydrates under Anaerobic Condition in the Biological Excess Phosphate Removal Process"; Water Sci. Tech., 26 (5/6), 933–942.

Satoh, H., Mino, T., and Matsuo, T. (1994) "Deterioration of Enhanced Biological Phosphate Removal by the Domination of Microorganisms without Polyphosphate Accumulation"; Water Sci. Tech., 30(6), 203–211.

Matsuo, T., Mino, T., and Satoh, H. (1992) "Metabolism of Organic Substrate in Anaerobic Phase of Biological Phosphate Uptake Process"; Water Sci. Tech., 25(6), 83.

Gerber, A., and Winter, C.T. (1985) "The Influence of Extended Anaerobic Retention Time on the Performance of Phoredox Nutrient Removal Plants"; Water Sci. Tech. 17 (2/3),81.

Somiya, I., Tsuno, H., and Matsumoto, M. (1988) Phosphorous Release–Storage Reaction and Organic Substrate Behavior in Biological Phosphorus Removal; Water Res., 22(1), 49–58.

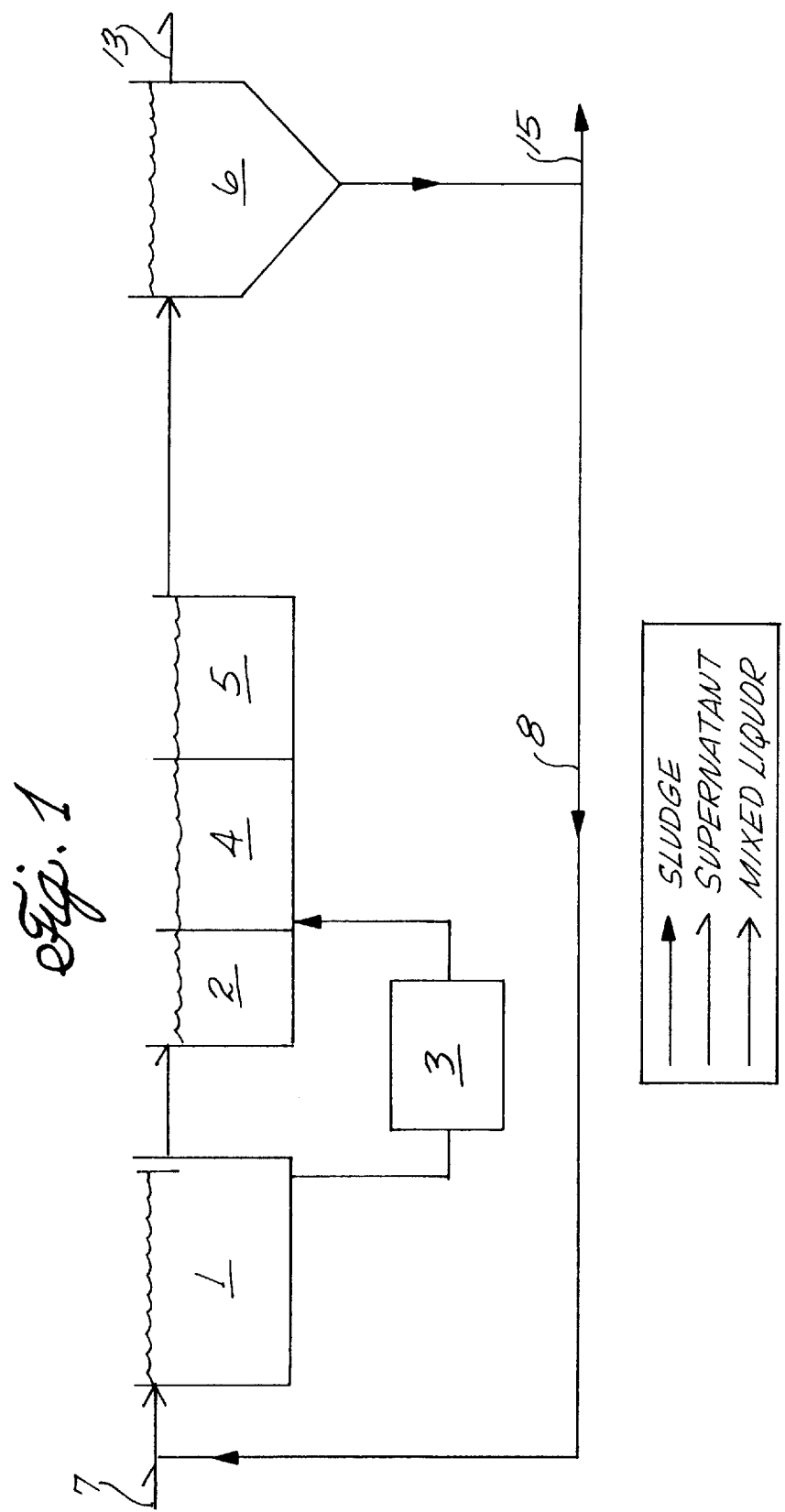

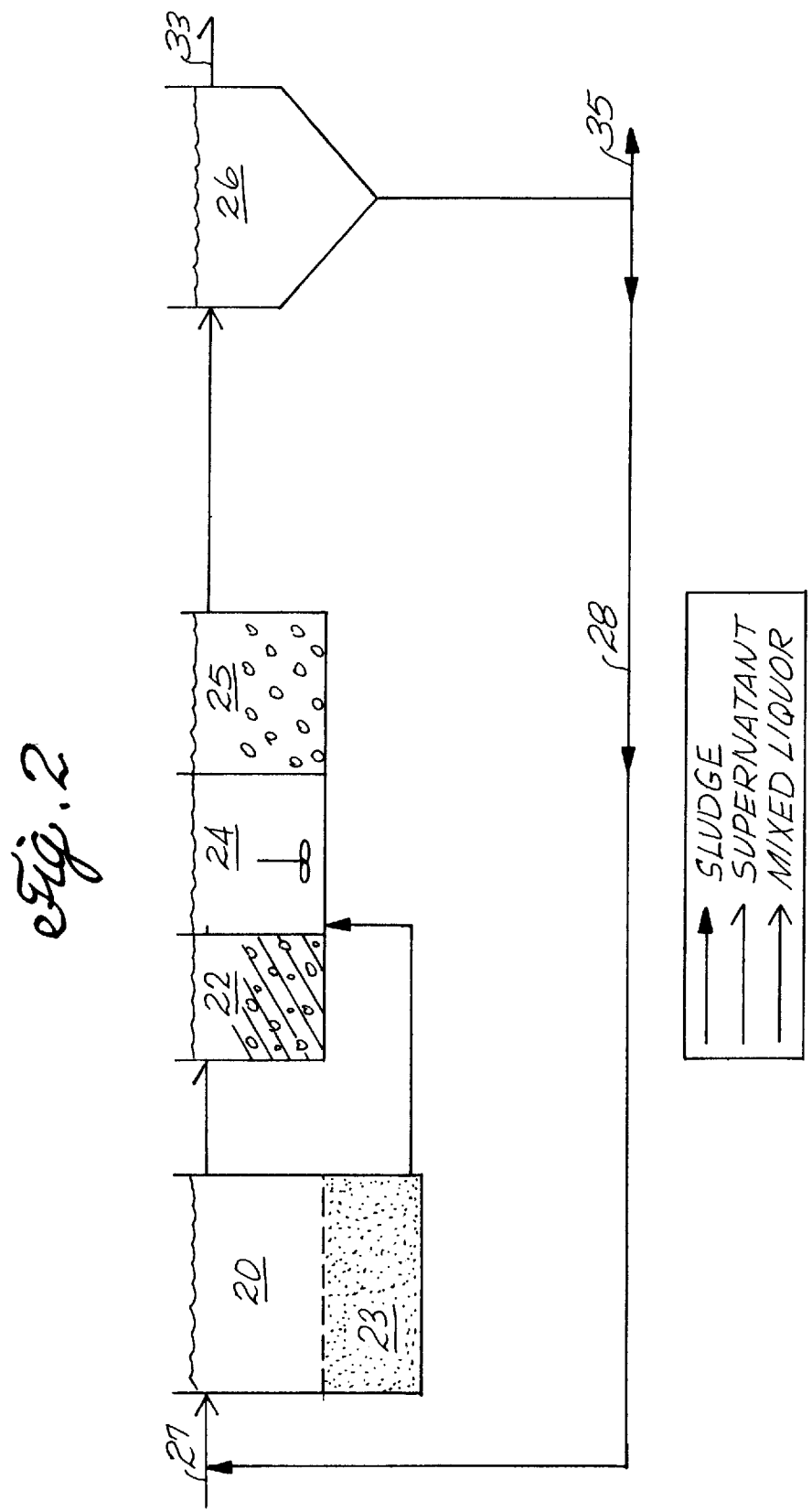

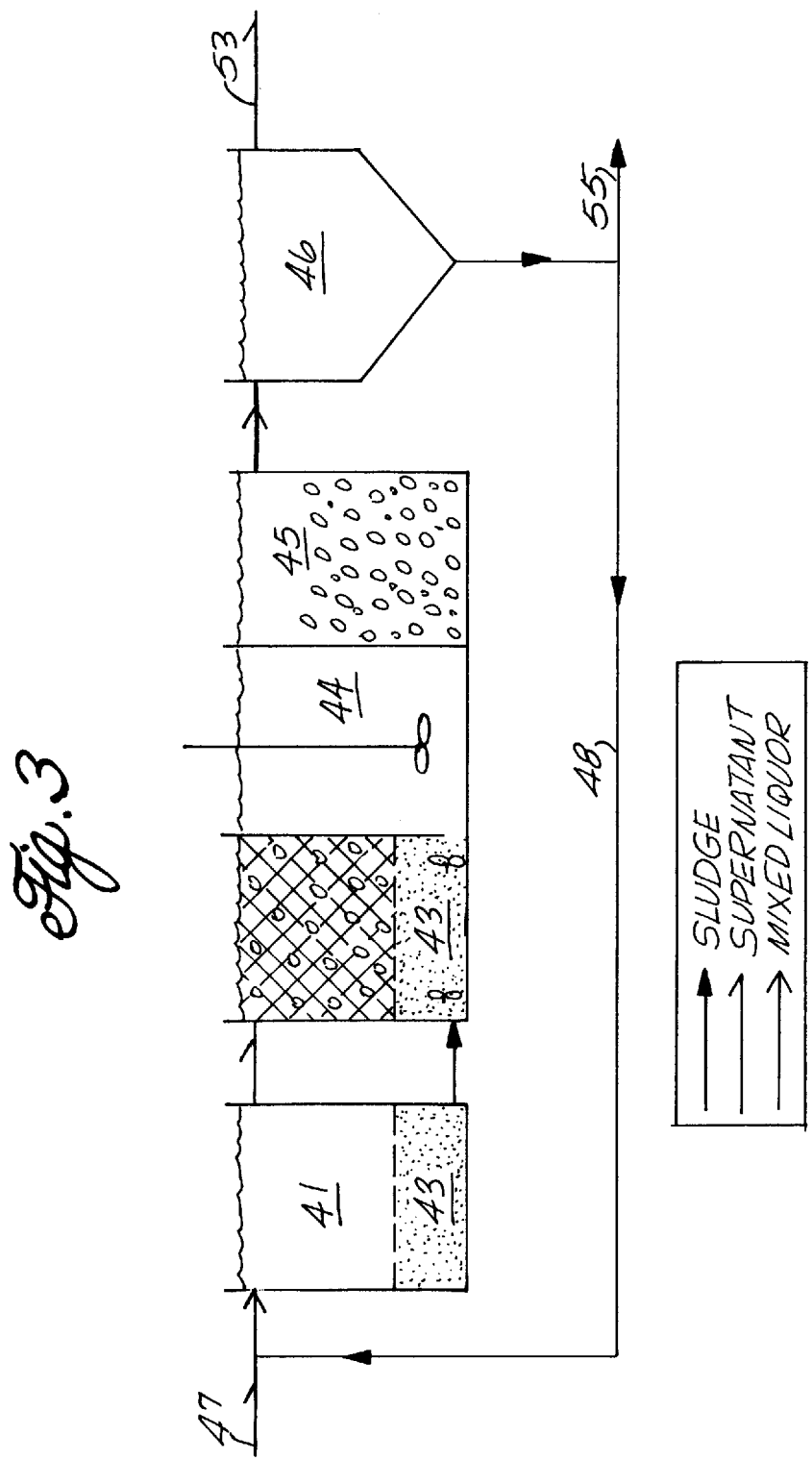

PROCESS FOR BIOLOGICALLY REMOVING PHOSPHORUS AND NITROGEN FROM WASTEWATER BY CONTROLLING CARBOHYDRATE CONTENT THEREIN

FIELD OF THE INVENTION

The present invention generally relates to a process and a system for microbiologically removing phosphorus and nitrogen nutrients from wastewater and more particularly to a process and a wastewater treatment system having an improved efficiency for biologically removing phosphorus and nitrogen from wastewater by using extended anaerobic sludge degradation (EASD) and/or controlling the sludge carbohydrate content therein.

BACKGROUND OF THE INVENTION

The presence in the environment of nutrients such as phosphorus and nitrogen, is one of the primary causes of entrophication. Therefore, removing the nutrient from wastewater by a suitable process and a treatment system is an important project in the wastewater treatment for protecting the receiving water from entrophication. It is of great importance to cut down and prevent environmental pollution.

One approach for accomplishing nutrient removal is biological treatment in a modified activated sludge system without chemical addition. Numerous biological nutrient removal processes have been developed in which the phosphorus removal is achieved by providing the activated sludge an alternating anaerobic/aerobic conditions. It is generally believed that certain polyphosphate accumulating microbes can hydrolyze intracellular polyphosphates into phosphate, the energy thus produced is used for the uptake of organic matters (measured as COD) in the wastewater, in the following aerobic condition, the stored COD are oxidized to supply energy for the polyphosphate regeneration. The overall phosphorus removal is achieved by the final wastage of high phosphorus containing microbes (also named as activated sludge). Therefore, it can be summarized that in the processes described above, the role of the anaerobic reaction is regarded as (1) to meet the needs of phosphorus release and the uptake of COD by phosphate accumulating microorganisms (2) to ferment the organic components present in wastewater so as to improve the efficiency of phosphorus removal.

In these processes, the nitrogen compound removal is done by nitrification followed denitrification. The process of nitrification is carried out in an aerobic environment in which organic/ammonia nitrogen present in the wastewater is converted into nitrate and nitrite, which are in turn reduced into $N_2$ in the course of denitrification.

One of these biological nutrient removal process which is commonly used is known as the Bardenpho Process. The Bardenpho Process consists of an initial anaerobic contact zone followed by four alternating stages of anoxic and aerobic conditions. It is capable of achieving a high percentage of nitrogen removal and phosphorus removal. However, the Bardenpho Process requires substantially large tank volumes than conventional activated sludge systems which means higher capital outlays. Additionally, the Bardenpho System relies on endogenous respiration in the second anoxic reactor which is a relatively slow process. Thus, its use is limited to small plants.

Another biological nutrient removal process which is frequently used is known as the AAO Process. The AAO process consists of three treatment zones-anaerobic, anoxic, and aerobic.

The wastewater is mixed with returned sludge in the anaerobic zone to promote the growth of polyphosphate accumulating microbes. The anaerobic zone is followed by an anoxic denitrification zone. The third zone is an aerobic zone for nitrification of the mixed liquor. The nitrified mixed liquor is recycled back to the anoxic denitrification zone for denitrification. The AAO system does not achieve high efficiencies of nitrogen removal because (1) the nitrogen removal efficiency depends upon the mixed liquor recycle ratios; (2) a substantial part of influent COD is oxidized in the course of nitrification. This part of COD is necessary for the rapid and complete denitrification.

Emphasizing on saving COD for denitrification, multiples-stage sludge systems were developed (U.S.-5,213,681), it can partially overcome the drawbacks of the AAO process. The nitrogen removal capacities is about 19 mg/l with removal efficiency of 76–80% when influent BOD is 81–88 mg/l and COD being 300 and 209 mg/l, respectively. However, the operational cost is quite high because of the long aerobic HRT, the multiple-stage recycling and high recycle ratios of mixed liquor. In addition, the total phosphorus removal capacities were relatively low (2.8 and 2.6 mg/l), respectively. The aerobic hydraulic retention times (HRT) are quite long 8.2 hours.

PCT/DK92/00381 (WO 93/12044) described a process in which concurrent nitrification and denitrification occurred in a aerobic zone with DO level of 8mg/l. This performance is induced by holding the returned sludge for at least 4 hours. Extracellular COD is used as electron donors for the denitrification. However, with very long total BRT of 24 hours and influent BOD as high as 192 mg/l, the nitrogen removal capacities are about 18 mg/l and phosphorus removal capacity ranged from 3.4 to 5.8 mg/l.

In these processes described above, the effects of sludge carbohydrate metabolism on nutrient (phosphorus and nitrogen) and COD removal are ignored. The effects are described below:

The sludge carbohydrate content decreased in the anaerobic stage and increased in the aerobic stage. The degradation of sludge carbohydrate provides reducing power and energy for the anaerobic uptake of COD by sludge, it also provides energy for the maintenance of sludge living activities under anaerobic conditions.

The sludge carbohydrate content is in an inverse relation with sludge phosphorus content. To control sludge carbohydrate content to low levels (below 9%) appears to be a prerequisite for high sludge capacities of phosphorus removal.

Extended anaerobic reactions are very effective in enlarging the overall sludge capacity for phosphorus removal. It is also very effective in control sludge carbohydrate content to low levels.

Both the products of those anaerobic reactions and the influent COD can be at least partially oxidized into sludge carbohydrate in the aerobic stage.

Molecular oxygen appeared to be a prerequisite for sludge carbohydrate synthesis. High DO level and/or long aerobic HRT of the aerobic stage allow more sludge carbohydrate to be synthesized.

On the other hand, the products of the anaerobic reactions and influent COD can also be used as electron donors for denitrification. Therefore sufficient denitrification is helpful to control sludge carbohydrate synthesis by reducing the required carbon sources.

The extended anaerobic reaction also increases substantially the rate of denitrification.

Therefore, these processes described above can not ensure reliable high phosphorus removal capacities because they do not allow EASD and are not capable to control sludge carbohydrate content to low levels. Their reliable phosphorus removal capacities are relatively low (about 3–4 mg/l). They are not suitable for the treatment of wastewater of high phosphorus concentration (from 5 to 10 mg/l for example). Further more, in those processes the rate of the denitrification is therefore inherently and strongly dependent upon the nature and concentration of influent COD. The utilization efficiency of influent COD for denitrification is limited. The nitrogen removal efficiency is restricted by the mixed liquor recycling ratio. Finally, those processes described above usually have quite high DO level in the aerobic stages as well as very long aerobic HRTs, and are, therefore, energy consuming and not suitable for the control of sludge carbohydrate synthesis.

Accordingly, there is a need for a biological nutrient removal process which effectively produces high sludge phosphorus removal capacity by EASD and the control of sludge carbohydrate content, which substantially reduces the total hydraulic retention time of wastewater, which substantially reduces the dependence of nitrogen removal capacities on influent COD nature and concentration, which gets ride off the mixed liquor return and its limitation on nitrogen removal, which substantially reduces the oxygen demand, which enlarges the treatment capacity of present biological nutrient removal plants and which minimizes capital outlays required to retrofit (upgrade) conventional activated sludge system.

SUMMARY OF THE INVENTION

Therefore, it is an object of the present invention to provide an activated sludge process which had the maximum and reliable capacity for phosphorus removal mainly by extended anaerobic sludge degradation and/or the control of sludge carbohydrate content.

Another object of the present invention is to provide an activated sludge process which achieves denitrification using mainly products of extended anaerobic reactions as electron donors. This allows very high denitrification rates and also maximum capacity of nitrogen removal.

It is a further object of the present invention to provide an activated sludge process for removing nutrients without the addition of either the fermentation products (for example, from fermenting primary sludge) or any external carbon source.

It is a further object of the present invention to provide an activated sludge process for removing COD and nutrients biologically with minimum oxygen (energy) consumption.

It is a further object of the present invention to provide an activated sludge process for biological nutrient removal without mixed liquor return.

It is a further object of the present invention to provide an activated sludge process with relatively short hydraulic retention time, and which requires very low capital cost for enlarging the treatment capacities of present biological nutrient removal plants and for upgrading present conventional activated sludge systems.

The present invention provides an activated sludge process for biological removing phosphorus, nitrogen nutrients from wastewater, which comprises the following steps.

(1) anaerobic contact/separation, mixing raw wastewater which contains phosphorus, nitrogen and organic matters (measured as COD) with returned activated sludge to form a mixed liquor, and then allowing the mixed liquor to settle to separate settled sludge from the supernatant; (2) aerobic nitrification, EASD and sludge carbohydrate content control (SCCC), the supernatant being nitrified under aerobic condition by fixed membrane of nitrifying microorganism, while the separated sludge being held under anaerobic conditions for a sufficient period of time in order to enlarge the sludge capacities for phosphorus removal and to control the sludge carbohydrate content to low levels; (3) anoxic denitrification, transferring and re-mixing the nitrified supernatant and the sludge, which has been anaerobically held for a period of time in last step, in a zone of anoxic conditions so that nitrate and nitrite present in the supernatant are denitrified by the sludge; wherein phosphorus in the liquid phase is at least partially, taken up by the sludge; (4) aerobic phosphorus uptake, transferring and aerating the denitrified mixed liquor from last step, to enable the microorganisms in the sludge to take up phosphorus from the liquid phase; (5) settlement separation, transferring the aerated mixed liquor to a final settlement separation zone where settled sludge of high phosphorus content is separated from purified supernatant; and (6) recycling at least a portion of the settled sludge back to re-contact with raw wastewater.

The present invention also provides a wastewater treatment system suitable for biological phosphorus and nitrogen removal of claim 1, comprising a sludge-wastewater contact/separation tank, an EASD tank, a packing nitrification tank, a denitrification tank, an aerobic tank and a final settling tank; said sludge-wastewater contact/separation tank consisting of a sludge-wastewater mixing zone and a settlement separation zone, located at the downstream of preliminary settling tank which is optional; said the EASD tank being a sludge tank, located at downstream of the sludge-wastewater contact/separation tank; and packing nitrification tank being a wastewater tank, located at the downstream of the sludge-wastewater contact/separation tank, equipped with aerators for oxygen supply and also packed with packings which support physically the growth of membrane of microorganisms especially of nitrifying microorganism; said denitrification/nitrogen removal tank being a sludge-wastewater mixed liquor tank located at downstream of the EASD tank and the packing nitrification tank and equipped with stirrers; said the aerobic tank being a sludge-wastewater mixed liquor tank, located at the down stream of the denitrification/nitrogen removal tank and equipped with aerators to maintain the dissolved oxygen (DO) to certain levels; said final settling tank located at downstream of the aerobic tank to separate sludge from supernatant.

Thereby, we achieve the present invention and meet the need for a biological nutrient removal process which effectively controls sludge carbohydrate content to produce reliable and high phosphorus removal capacity, which substantially reduces the total hydraulic retention time of wastewater, which substantially reduces the dependence of nitrogen removal capacities on influent COD nature and concentration; which substantially reduces the oxygen demanded for COD removal, which gets ride off the mixed liquor return, which enlarges the treatment capacity of present biological nutrient removal plants and which minimizes capital outlays required to retrofit (upgrade) conventional activated sludge systems.

BRIEF DESCRIPTION OF THE DRAWINGS

FIG. 1 is schematic diagram illustrating the basic process steps in accordance with the present invention.

FIG. 2 is schematic diagram illustrating the basic process steps of the present invention as an embodiment.

FIG. 3 is schematic diagram illustrating the basic process steps of the present invention as a further embodiment.

DETAILED DESCRIPTION OF THE INVENTION

After careful study over the years, this inventor has confirmed that, under anaerobic conditions, microbes tend to use the energy supplied by intracellular carbohydrate degradation for subsistence, and not by polyphosphate hydrolysis for taking up organics. Only after the sludge carbohydrate content having dropped to below 10%, can microbes use energy supplied by polyphosphate hydrolysis for taking up organics and releasing phosphorus simultaneously. In other words, when the sludge carbohydrate content is quite high, although microbes can also take up organics, but can not remove phosphorus. Only after the carbohydrate content having dropped to below 10%, satisfactory phosphorus removal results can then be obtained. It is thus evident that, the high or low of carbohydrate content of sludge and of microbes would be the key factor for determining the results of biological phosphorus removal. As a general rule, intracellular carbohydrate degradation can be occurred only under anaerobic conditions. At anoxic (having $NO_3^-$) stage, intracellular carbohydrate content is essentially kept constant; and at aerobic stage, intracellular carbohydrate is synthesized and accumulated. At anaerobic stage, carbohydrate degradation can be classified as fast-and slow forms. The former is accompanied by uptake of organics and release of phosphorus. Only after carbohydrate content is greatly higher than 10%, does polyphosphate not hydrolyze or do very slowly. The slow form occurred only after enough organics have been taken up by microbes and usable organics in water exhausted. The amount of degradation increases as the anaerobic duration increases. The intracellular carbohydrate synthesis/accumulation and degradation/conversion processes do provide possibility for controlling activated sludge carbohydrate content, and further improving biological phosphorus removal results.

On the basis of the above study results, we make a series of improvements for reducing the carbohydrate content of activated sludge and microbes, so as to improve the results of biologically removing phosphorus.

In the used wastewater treatment system, a carbohydrate degradation tank is added in the main stream of biological phosphorus removal system, so as to drop the carbohydrate content to below 10%, preferably between 6 to 9%(WIW), at the end of anaerobic stage. Activated sludge after being subjected to carbohydrate degradation and full uptake of organics, then after denitrification/nitrogen removal, the intracellular organics taken up is partially utilized. After transferring into aerobic tank. It undergoes aerobic phosphorus uptake, the amount of synthesized/accumulated carbohydrate from intracellular organics taken up by microbes would not be too high. When activated sludge whose carbohydrate content has been controlled is returned to anaerobic phosphorus release stage, the normal carbohydrate degradation, uptake of organics and phosphorus release can be ensured, so as to improve the biological phosphorus removal results.

Now referring to FIG. 1, more detailed illustration on the present invention is given as below. As shown in FIG. 1, the wastewater treatment system is an artesian system comprising sludge-water contact/separation tank (anaerobic contact and separation zone 1), packing nitrification tank (an nitrification zone furnished with packings 2), carbohydrate degradation tank (an anaerobic sludge degradation zone 3), denitrification/nitrogen removal tank (a denitrification zone 4), aerobic tank (an aeration zone 5) and final settling tank (a final settlement zone 6). sludge-water contact/separation tank is a sludge-water settling basin with sludge zone, located at downstream of raw wastewater first settling basin, its main function is contacting the raw wastewater with returned activated sludge and settlement/separating. Settled sludge is transferred into sludge zone. Carbohydrate degradation tank is a sludge chamber, located at downstream of sludge-water contact/separation tank and equipped with controlling unit for adjusting sludge flow rate. Except set up alone (carbohydrate degradation tank 3), carbohydrate degradation tank can also be located at the sludge zone's extension of sludge-water contact/separation tank (carbohydrate degradation tank 1), or at the packing nitrification tank's extension and separated therefrom (carbohydrate degradation tank 2), or the packing nitrification tank's extension which is formed from two abovementioned degradation tanks (1 and 2) can be used simultaneously as carbohydrate degradation tank. Packing nitrification tank is a wastewater tank, located at the downstream of sludge-water separation tank. It is packed with packing on which biological membrane of nitrifying bacteria grown up is covered, and equipped with aerating apparatus (aerator/oxygenator). Its main function is nitrifying the supernatant from sludge-water contact/separation tank. Denitrification/nitrogen removal tank is a sludge-water mixing tank, located at downstream of carbohydrate degradation tank and packing nitrification tank, equipped with stirrer therein. Its main function is mixing activated sludge after carbohydrate degradation with $NO_3^-$-containing effluent after nitrification to carry out denitrification. Aerobic tank is also a sludge-water mixing tank, located at downstream of denitrification/nitrogen removal tank, equipped with aerating apparatus (aerator/oxygenator) therein, aerobic phosphorus uptake and residual organics removal are carried out thereat. Final settling tank is a sludge-water settling tank with sludge zone, located at downstream of aerobic tank, activated sludge after settlement separating is passed into sludge zone, a slurry pump is equipped in returned pipeline. A preliminary settling zone ahead of the system is optional.

The process of the invention mainly comprises the steps of anaerobic contact/separation carbohydrate degradation, aerobic nitrification,anoxic denitrification, aerobic phosphorus uptake and settlement separation, etc., i.e. firstly contacting raw wastewater which contains nitrogen/phosphorus nutrients with returned activated sludge at anaerobic stage and settlement separating. Wastewater supernatant after settlement separation undergoes nitrification at aerobic stage. Sludge after settlement separation and after carbohydrate degradation at anaerobic stage is mixed with nitrified wastewater and undergoes denitrification at anoxic stage. Denitrified sludge water takes up phosphorus at aerobic stage, then undergoes settlement separation. Supernatant after settlement is the effluent in which phosphorus/nitrogen nutrients have been removed. After settlement separation, a portion of high phosphorus-containing sludge is returned and recontacted with raw wastewater, the remaining high phosphorus-containing sludge is discharged in the form of residual sludge from treatment system.

Therefore, the process comprises of a sludge-wastewater contact/separation tank, an extended anaerobic sludge (EASD) tank, a packing nitrification tank, a denitrification tank, an aerobic tank and a final settling tank. The functions of these tanks or zones are described into details below.

Zone 1 is an anaerobic zone in which neither dissolved oxygen nor nitrates/nitrites is present. It is divided into a contact zone and a settlement zone in practice. At the inlet of the contact zone influent (wastewater) is mixed with the returned activated sludge to form a mixed liquor, which is mixed for a certain period of time while it flows preferably in a plug flow form in the contact zone. During this period microorganisms in the sludge take up soluable COD present in the liquid phase using energy derived from the hydrolysis of polyphosphates and the degradation of intracellular carbohydrates and other forms of reaction.

It should be noted that the carbohydrate and polyphosphate content of the returned sludge are mutually influenced. When the sludge carbohydrate content is high, say above 25% (WIW), the sludge phosphorus content is very low (about 2%). In this case sludge carbohydrates act as the main energy source for the anaerobic COD uptake, and no phosphate releases. This means the decline of bilogical phosphorus removal and is undesirable.

In the contact period, a part of non-soluble COD is also adsorbed by the sludge flocs. Fermentation of the non-soluble COD by the sludge is another important reaction in this period.

Then the mixed liquor is allowed to settle in the settlement zone to produce supernatant and settled solids (sludge). The supernatant contains less COD and more phosphorus than the raw wastewater does due to the COD uptake and phosphorus release as described above.

Zone 2 is an aerobic zone which is furnished with aeration devices to supply oxygen and also packings to support physically the growth of nitrifying microorganisms etc.. Ammonia and organic nitrogen compounds present in the supernatant from zone 1 are oxidized into nitrates/nitrites by the nitrifying organisms on the packings. The DO level in this zone is preferably about 2 mg/l and propellers and installed to provide sufficient mixing when necessary.

A substantial nitrogen removal is observed due to the concurrent denitrification that occurs inside the packings. COD degradation also occurs.

Zone 3 is an anaerobic zone which receives the settled sludge from zone 1. It allows the anaerobic reactions to be extended in a relatively small tank volume. In order to supply energy to maintain living activities of the microorganisms in the sludge, polyphosphates are continually hydrolyzed but at relatively quite low rate, and sludge carbohydrates are continually degraded. The rate of the carbohydrate degradation depends upon the level of sludge carbohydrate content. When the sludge carbohydrate content is low, say about 8%, the carbohydrate degradation is almost unobservable. Nevertheless, the extended anaerobic sludge degradation (EASD) is very effective in controlling the sludge carbohydrate synthesis in the following aerobic zone (Zone 5).

The EASD is highly recommendable for its effect in enlarging the sludge capacities for phosphorus removal probably because of its reliable function in controlling sludge carbohydrate synthesis. With fixed influent composition and operational mode, the increase of EASD from 2 to 6 hours or more means a substantial increase of phosphorus removal capacities of the system, say from 3 to 10 mg/l or more.

Another important role of the EASD is that it changed the nature of both extracellular COD adsorbed by the sludge and intracellular carbon polymers of the sludge so that these carbon sources become more readily to be used by denitrifying microbes under anoxic conditions.

Zone 4 is a denitrification zone furnished with mixing machine, in which the nitrified liquid from zone 2 is mixed with the sludge from the EASD zone 3. Nitrate and nitrite present in the nitrified liquid is denitrified into element nitrogen by denitrifying organisms within the sludge with high rates. Acting as the main electron donors for the denitrification, the products of the extended anaerobic sludge degradation gives quite high denitrification rates.

It should be noted that phosphorus in the liquid phase is partially taken up by the sludge under the anoxic conditions in this zone.

Zone 5 is an aerobic zone, in which the mixed liquor from the denitrification zone 4 is aerated. Phosphorus in the liquid phase is completely taken up by the sludge.

As the carbon sources (products of EASD) within the sludge is not completely utilized in the course of denitrification in zone 4, the left carbon sources will be partially oxidized into sludge carbohydrates. The extent of the carbohydrate synthesis depends upon the DO level in the mixed liquor, which is preferably maintained at about 2 mg/l to prevent excessive sludge carbohydrate synthesis. The aerobic HRT in this zone should not exceed the total HRT in zones 1 and 3.

Zone 6 is a settlement tank. The mixed liquor from zone 5 is allowed to settle in this zone. The sludge is settled and thus separated from the purified supernatant which is free of phosphorus and nitrogen and is discharged as effluent. A portion of the settled sludge of high phosphorus content is recycled back to the inlet of the process (zone 1) to be mixed with the influent, the rest of the settled sludge is wasted as sludge wastage.

Therefore, according to the present invention, the raw wastewater is first mixed with the returned activated sludge, the mixed liquor thus formed is then allowed to settle in the anaerobic contact and separation zone, where organic pollutants present in the influent are absorbed or/and adsorbed by the returned activated sludge and are removed from the liquid phase (supernatant) as the sludge participates. The supernatant thus produced is then transferred into the nitrification zone which is furnished with aeration device and packings. Ammonia and organic nitrogen present in the supernatant are oxidized into nitrate and nitrite by nitrifying organisms that grow on the packings inside the tank. The settled solids from the anaerobic contact and separation tank is transferred into the anaerobic sludge degradation tank. The length of sludge retention time in this tank is critical in determining the sludge capacity for phosphorus removal (measured as total phosphorus content of the sludge P/MLSS, W/W) as well as the subsequent denitrification rate. In the denitrification zone, a mechanical or a hydraulic stirrer is installed, the sludge from the sludge degradation zone is mixed with the liquid from the nitrification zone. The nitrate and nitrite present in the liquid is denitrified into element nitrogen by denitrifying organisms within the sludge. The products of the anaerobic sludge degradation are used as the main electron donors for the denitrification. The mixed liquor from the denitrification zone is then transferred into the aerobic zone to complete the uptake of phosphorus from the liquid phase. DO level in this zone is low enough to control the sludge carbohydrate synthesis. The mixed liquor from this zone is transferred and allowed to settle in the final settlement zone. The clear supernatant is discharged and a portion of the settled solids are recycled for mixing with the influent water.

In a preferred embodiment of the invention, COD present in the influent water is mostly (up to 90%) taken up by the returned sludge 8 in the anaerobic contact and separation zone 1. Sludge carbohydrate content in the settled solid of zone 1 decreased to about 7% (CH/MLSS). It is remarkable that the extended anaerobic sludge degradation in zone 3 is very effective in enlarging the sludge capacities of phosphorus removal although the sludge carbohydrate decrease is not substantial when the sludge carbohydrate content is low. It is also very effective in controlling the sludge carbohydrate synthesis in zone 5. The length of the extended anaerobic sludge degradation depends upon the phosphorus concentration of the influent which is to be reduced to a level below 1 mg/L. The COD concentration of the supernatant from zone 1 is very low. This allows very high nitrification rate in the following nitrification zone 2. The size of the nitrification zone is substantially reduced. All the COD taken up by the sludge in zone 1 is available for the denitrification in zone 4, the denitrification capacities is thus increased in comparison with other processes described above. Furthermore, the extended anaerobic sludge degradation in zone 3 increased the denitrification rate by 40% in zone 3. In the preferred embodiment of the invention. The influent COD is mostly removed in the anaerobic contact and separation zone without consumption of molecular oxygen. The products of the anaerobic reactions are mostly consumed by the denitrification. This is very helpful in controlling sludge carbohydrate synthesis. Because of the low DO level and relatively short retention time of aerobic reaction in zone 5, sludge carbohydrate synthesis is again restrained, and a substantial portion of the products of the anaerobic reactions are removed from the process with sludge wastage without being oxidized. This process is, therefore, energy-saving.

An alternative embodiment of the anaerobic sludge degradation is to retain the settled solid of zone 1 for a long period of time in the enlarged sludge funnels of zone 1(FIG. 2).

Another alternative embodiment of the anaerobic sludge degradation is retained the settled solids of zone 1 at the not-aerated bottom of the nitrification zone, which is mutually separated from the nitrifying zone, for a long period of time. In this case, a propeller is installed to plug the sludge forward (FIG. 3).

According to the invention, the wastewater treatment system being simple, process being skillful, intracellular and activated sludge carbohydrate synthesis/accumulation and degradation/conversion can be effectively controlled, thus biologically phosphorus/nitrogen removal results is markedly improved, rate of phosphorus removal can be above 90%.

To control sludge CH content to low levels (less than 10%) appeared to be a prerequisite for high sludge capacities for phosphorus and nitrogen removal (5–12 mg/l P, up to 35 mg/l N for typical municipal wastewater) and economically suitable for use in full scale plants of any treatment capacity.

Moreover, because most part of organics has been removed in anaerobic step, the energy consumption of aerating/oxygenating in aerobic step can be decreased greatly, tank volume can be reduced correspondingly. Either the products of those anaerobic reactions or influent COD can be at least partially oxidized into sludge carbohydrate in the following aerobic stage. As molecular oxygen appeared to be a prerequisite for sludge CH synthesis, low dissolved oxygen (DO) concentration and relatively short aeration time limit the aerobic sludge carbohydrate synthesis. On the other hand, either the products of those anaerobic reaetions or influent COD can also be used as electron donors for denitrification, to supply energy for polyphosphate synthesis and sludge-activity maintenance. Therefore sufficient denitrification consuming COD and the products of the anaerobic reactions will reduce the carbon sources available for sludge CH synthesis. It is remarkable that the products of extended anaerobic reaction increase substantially the rate of denitrification. Therefore, this invention is particularly suitable for phosphorus/nitrogen removal from wastewater.

Now, the present invention is specifically described with reference to Examples and Comparative Examples. However, it should be understood that the present invention by no means restricted by such examples.

EXAMPLES 1 and 2

Two laboratory units were operated as shown in FIG. 1 over a period of four weeks. The results are reported in Table 1 below.

TABLE 1

|  | Example 1 | Example 2 |
| --- | --- | --- |
| Influent |  |  |
| COD (mg/l) | 336 | 230 |
| TKN (mg/l) | 39 | 25 |
| $NH_3$—N (mg/l) | — | 25 |
| Total P (mg/l) | 10.5 | 10.7 |
| Operation Conditions |  |  |
| Total HRT (h) | 12 | 12 |
| Anaerobic Contact HRT (h) | 0.5 | 0.5 |
| Anaerobic Settlement HRT (h) | 1.5 | 1.5 |
| Extended Anacrobic Sludge |  |  |
| Degradation HRT (h) | 4.0 | 4.0 |
| Nitrification HRT (h) | 1.5 | 1.5 |
| DO in Nitrification Zone (mg/l) | 2.5 | 2.5 |
| Denitrification HRT (h) | 2.5 | 2.5 |
| Aerobic HRT (h) | 2.0 | 2.0 |
| DO in Final Aerobic Zone (m/l) | 2.5 | 2.2 |
| Sludge Recycle (% of influent) | 100% | 100% |
| MILSS (mg/l) | 3381 | 3250 |
| CH/MLSS (5) at the End of the Aerobic zone | 9% | 6.8% |
| Effluent |  |  |
| COD (mg/l) | 36 | <10 |
| TKN (mg/l) | 4.5 | 2.3 |
| $NH_3$—N (mg/l) | 0.3 | 0.2 |
| Total P (mg/l) | 0.6 | 0.2 |

The sludge recycle was set at 100% because of the limit of reliable pump flow rate (4 L/h) that is used in these experiments. It has been reduced to 70% in the experiments (for one week) without influencing the nutrient removal performances. In this case, the EASD HRT is reduced to about 3 hours, and total HRT is reduced to 11 hours.

In these two experiments, the nitrogen removal capacities are about 35 and 22 mg/l, respectively. Phosphorus removal capacities are about 10 mg/l. The sludge carbohydrate content is maintained at quite low levels of about 6–9%.

Comparative Example

Another laboratory experiment was operated as shown in FIG. 2 over a period of two weeks. However, the sludge funnel of the anaerobic contact/separation tank is quite small. The results are reported in Table 2 below.

TABLE 2

|  | Comp. Example |
|---|---|
| Influent |  |
| COD (mg/l) | 195 |
| TKN (mg/l) | 23 |
| $NH_3$—N (mg/l) |  |
| Total P (mg/l) | 9.2 |
| Operation Conditions |  |
| Total HRT (h) | 10.5 |
| Anaerobic Contact HRT (h) | 0.5 |
| Anaerobic Settlement HRT (h) | 1.5 |
| EASD HRT (h) | 0.5 |
| Nitrification HRT (h) | 2.0 |
| DO in Nitrification Zone (mg/l) | 3.0 |
| Denitrification HRT (h) | 2.5 |
| Aerobic HRT (h) | 3.5 |
| DO in Aerobic Zone (mg/l) | 3.0 |
| Sludge Recycle (% of influent) | 100% |
| MILSS (mg/l) | 2720 |
| CH/MLSS (5) at the End of the Aerobic zone | 22% |
| Effluent |  |
| COD (mg/l) | 15 |
| TKN(mg/l) | 5.5 |
| $NH_3$—N (mg/l) | 0.3 |
| Total P (mg/l) | 7.9 |

In comparison with Table 1, the sludge carbohydrate content at the end of the aerobic stage is very high. The phosphorus removal capacities is quite poor. This is because the EASD HRT is quite short in this experiment. Nitrification is not affected. However, the nitrogen removal capacity is only 17.5 mg/l.

The present invention may be carried out in other specific ways than set forth without departing from the spirit and essential characteristics of the invention. The present embodiments are, therefore, to be considered in all respects as illustrative and not restrictive and all changes coming within the meaning and equivalency range of the appended claims are intended to be embraced therein.

We claim:

1. An activated sludge process for biological removing phosphorus, nitrogen nutrients from wastewater, which comprises the following steps:
   (1) anaerobic contact/separation, mixing raw wastewater which contains phosphorus, nitrogen and organic matters (measured as COD) with returned activated sludge to form a mixed liquor, and then allowing the mixed liquor to settle to separate settled sludge from the supernatant; (2) aerobic nitrification, EASD and sludge carbohydrate content control (SCCC), the supernatant being nitrified under aerobic condition by fixed membrane of nitrifing microorganism, while the separated sludge being held under anaerobic conditions for a sufficient period of time in order to enlarge the sludge capacities for phosphorus removal and to control the sludge carbohydrate content to low levels; (3) anoxic denitrification, transferring and re-mixing the nitrified supernatant and the sludge, which has been anaerobically held for a period of time in last step, in a zone of anoxic conditions so that nitrate and nitrite present in the supernatant are denitified by the sludge; wherein phosphorus in the liquid phase is at least partially, taken up by the sludge; (4) aerobic phosphorus uptake, transferring and aerating the denitrified mixed liquor from last step, to enable the microorganisms in the sludge to take up phosphorus from the liquid phase; (5) settlement separation, transferring the aerated mixed liquor to a final settlement separation zone where settled sludge of high phosphorus content is separated from purified supernatant; and (6) recycling at least a portion of the settled sludge back to re-contact with raw wastewater.

2. The process according to claim 1, wherein EASD is used to hold the settled sludge under anaerobic conditions for a sufficient period of time to enlarge the sludge capacities for phosphorus removal from 4 to 10 mg/l or more.

3. The process according to claim 1, wherein the levels of sludge carbohydrate content is mainly influenced by EASD, and controlled to a low level of 6–10% (W/W) at the end of the aerobic stage.

4. A wastewater treatment system suitable for biological phosphorus and nitrogen removal of claim 1, comprising a sludge-wastewater contact/separation tank, an EASD tank, a packing nitrification tank, a denitrification tank, an aerobic tank and a final settling tank; said sludge-wastewater contact/separation tank consisting of a sludge-wastewater mixing zone and a settlement separation zone, located at the downstream of preliminary settling tank which is optional; said the EASD tank being a sludge tank, located at downstream of the sludge-wastewater contact/separation tank; and packing nitrification tank being a wastewater tank, located at the downstream of the sludge-wastewater contact/separation tank, equipped with aerators for oxygen supply and also packed with packings which support physically the growth of membrane of microorganisms especially of nitrifying microorganism; said denitrification/nitrogen removal tank being a sludge-wastewater mixed liquor tank located at downstream of the EASD tank and the packing nitrification tank and equipped with stirrers; said the aerobic tank being a sludge-wastewater mixed liquor tank, located at the down stream of the denitrification/nitrogen removal tank and equipped with aerators to maintain the dissolved oxygen (DO) to certain levels; said final settling tank located at downstream of the aerobic tank to separate sludge from supernatant.

5. The treatment system according to claim 4, wherein the settlement separation zone of the sludge-wastewater contact/separation tank has a sludge funnel (funnels) which is enlarged to function as the EASD tank.

6. The treatment system according to claim 4, wherein the EASD tank is realized at the non-aerated bottom area of the packing nitrification tank.

7. The treatment system according to claim 4, wherein the EASD tank is an enlarged sludge funnel (funnels) of the settlement zone of the sludge-wastewater contact/separation tank and the non-aerated bottom area of the packing nitrification tank (an extension tank of the packing nitrification tank, which is mutually separated from the packing nitrification tank).

8. The treatment system according to claim 4, wherein the packing nitrification tank effects nitrogen removal due to concurrent nitrification-denitrification.

* * * * *